US005870624A

United States Patent [19]
Kikinis

[11] Patent Number: 5,870,624
[45] Date of Patent: Feb. 9, 1999

[54] PERSONAL DESKTOP SYSTEM FOR SCANNING AND PRINTING

[75] Inventor: Dan Kikinis, Saratoga, Calif.

[73] Assignee: Elonex I.P. Holdings, Ltd., London, United Kingdom

[21] Appl. No.: 932,730

[22] Filed: Sep. 17, 1997

Related U.S. Application Data

[63] Continuation of Ser. No. 507,520, Jul. 26, 1995, abandoned.

[51] Int. Cl.$^6$ .................................................. G06F 15/02
[52] U.S. Cl. .............................................................. 395/822
[58] Field of Search ................................... 395/821, 822, 395/827, 828, 825, 826, 830, 835

[56] References Cited

U.S. PATENT DOCUMENTS

| | | | |
|---|---|---|---|
| 4,365,779 | 12/1982 | Bates et al. | 248/371 |
| 4,414,579 | 11/1983 | Dattilo et al. | 358/256 |
| 4,727,245 | 2/1988 | Dobbins et al. | 235/472 |
| 4,967,233 | 10/1990 | Buchar et al. | 355/233 |
| 5,038,228 | 8/1991 | Takada | 358/498 |
| 5,040,074 | 8/1991 | Stemmle | 358/296 |
| 5,166,812 | 11/1992 | Dow et al. | 358/498 |
| 5,267,056 | 11/1993 | Stemmle | 358/472 |
| 5,278,396 | 1/1994 | McGaha | 235/432 |
| 5,339,139 | 8/1994 | Fullerton et al. | 355/215 |
| 5,359,425 | 10/1994 | Maehara et al. | 358/300 |
| 5,361,134 | 11/1994 | Hu et al. | 358/296 |
| 5,442,449 | 8/1995 | Stemmle et al. | 358/296 |
| 5,517,332 | 5/1996 | Barry et al. | 358/496 |
| 5,532,825 | 7/1996 | Lim et al. | 358/296 |
| 5,544,045 | 8/1996 | Garland et al. | 704/3 |
| 5,712,676 | 1/1998 | Takaki et al. | 347/262 |

*Primary Examiner*—Moustafa M. Meky
*Attorney, Agent, or Firm*—Donald R. Boys

[57] ABSTRACT

A personal I/O device incorporates a scanner and a printer apparatus in a common assembly with a document drive designed to feed a single document or blank sheet past both the scanner and the printer apparatus. The I/O device comprises control circuitry for driving and coordinating the document drive with the scanner and the printer apparatus, and communication apparatus for communicating with a remote computer host. In one embodiment the device comprises a platen with retaining mechanisms for holding a document in place while the platen is moved by the scanner and the printer apparatus. The device in some embodiments is integrated with a computer in a common enclosure, in others with a monitor stand, and in others provides a stand-alone configuration. The device provides a small, relatively inexpensive, and compact package which may be placed at a user's computer workstation.

12 Claims, 9 Drawing Sheets

PERSONAL DESKTOP SYSTEM FOR SCANNING AND PRINTING

CROSS REFERENCE TO RELATED APPLICATIONS

This is a continuation application Ser. No. 08/507,520 filed Jul. 26, 1995 now abandoned.

FIELD OF THE INVENTION

The present invention is in the area of apparatus and methods both for printing documents from computer files and for scanning documents to create computer files.

BACKGROUND OF THE INVENTION

Computer-aided printing enables users to create printed documents directly from text and graphics files generated by such as word processors and drawing programs. Likewise, computer-aided optical scanning enables users to store images and text as computer-resident files commonly known as pixel files having a bit-mapped format. The bit-mapped format of data stored in a pixel files, however, is unsuitable for use with a word processor, which responds to defined characters, such as ASCII format characters.

Because bit-mapped files are not character files, a pixel file first needs to be converted into an ASCII-based text file by means of Optical Character Recognition (OCR) software before its contents can be recognized and edited with a word processor.

Since printing and scanning devices are often expensive and typically occupy a substantial space, many companies have their employees share printing and scanning devices that are placed at a distance from their desks. Even in one-person offices, a printer, scanner or fax machine is typically not placed next to a user's desk where it would be immediately available.

To make a trip to a remote printer to pick up a printed document or to make a trip to a remote scanner to scan a document, is inconvenient and time consuming. Also, shared devices typically have conventional tray-feed (sheet feeder) or continuous-feed apparatus, which discourage printing both sides of a sheet of paper, which contributes to unnecessary paper consumption.

What is clearly needed is a low-cost device that combines printing and scanning functions and is yet small enough to be placed conveniently on a user's desk, or mounted in the base of a video monitor or in the case of a computer. A monitor stand serving as a housing for a device that combines printing and scanning functions according to embodiments of the present invention may be a separate stand upon which a monitor may be placed, or may be a part of a monitor.

Placement of a personal desktop system according to the present invention in a monitor stand or computer case enables a user to quickly scan or print documents without leaving the computer station, and without interrupting work flow. What's more, most state-of-the-art computers now are equipped with a communication device (modem), so a desktop I/O device for scanning and printing according to this invention combined with such a communication device provides a system similar to a facsimile system, that can transmit printed documents or print received documents conveniently at a user's desk. To be conveniently useful, this desktop I/O device must be able to accept documents ranging from business cards to legal size documents.

SUMMARY OF THE INVENTION

A Input/Output (I/O) device is provided, comprising a frame for supporting and positioning elements of the device; a document drive apparatus supported by the frame; a scanning mechanism supported by the frame and positioned to scan documents transported on the document drive; a printing mechanism supported by the frame and positioned to print on a sheet transported on the document drive; and control circuitry for managing and coordinating operation of the document drive, the scanning mechanism, and the printing mechanism. The control circuitry operates the document drive apparatus to move a document loaded to be scanned past the scanner mechanism and transmits scanned data to a remote host, and also receives data from a remote host and operates the document drive to move a sheet to be printed past the print mechanism and prints on the sheet to be printed according to the data received.

In one embodiment the document drive apparatus comprises a translatable platen spaced apart from a guide plate, with drive rollers contacting the platen through openings in the guide plate. The guide plate has, in some embodiments, apparatus for retaining a document or blank sheet to be processed. In one such embodiment the platen comprises a construction of first and second spaced-apart and joined plates defining an inner volume, the inner volume connected to a vacuum source, the first spaced-apart plates having openings therethrough for creating a pressure differential over a sheet placed on the first plate and covering one or more of the openings. In another such embodiment the platen comprises a plate connected to an electrical generator for charging the plate to an electrostatic potential for attracting and holding documents to be scanned or printed.

In an alternative embodiment the document drive apparatus comprises two spaced-apart guide plates defining a space between the guide plates with drive rollers extending through openings in the guide plates into the space between the guide plates. In a similar embodiment the document drive apparatus comprises two sets of spaced-apart plates and drive rollers, one above the other, the two sets defining an upper document drive apparatus and a lower document drive apparatus at different levels, and also comprises a turn-around passage leading from the space between one set of guide plates to the space between the other set of guide plates, for guiding a document from one of the upper and the lower drive apparatus to the other.

In various embodiments, an I/O device according to the invention is integrated with a monitor stand and with a computer in a common enclosure. Such an I/O device may also be a stand-alone device for placing near a user's workplace.

An I/O device according to an embodiment of the present invention provides a relatively simple and inexpensive scanner/printer at a user's workplace, eliminating long trips to scan documents and/or to retrieve printed documents. Such a device also lends itself to utilizing both sides of a sheet of paper in printing.

BRIEF DESCRIPTION OF THE DRAWINGS

FIG. 6b is a partial cross-section of a portion of a turn-around apparatus for use with a document drive system such as that described by FIG. 6a.

DESCRIPTION OF THE PREFERRED EMBODIMENTS

General Description

Figures 1A, 1B:
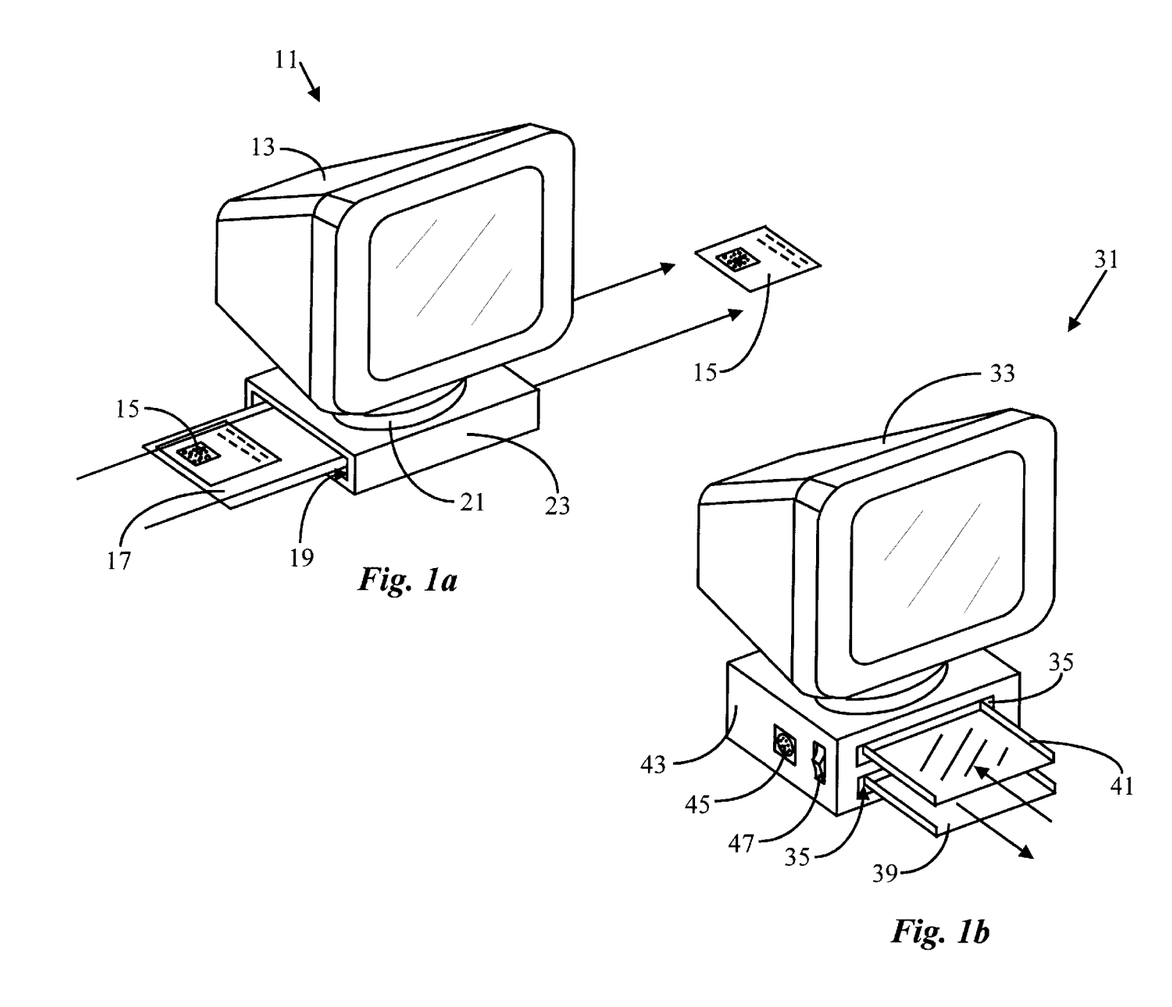
FIG. 1a is an isometric illustration of an I/O device according to an embodiment of the present invention.
FIG. 1b is an isometric illustration of an I/O device according to an alternative embodiment of the invention.

FIG. 1a is an isometric illustration of a system 11 wherein a personal I/O device for scanning and printing, according to an embodiment of the present invention is integrated into a support stand 23 for a computer monitor. System 11 comprises any commercially available monitor 13, a monitor stand 23, a positioning mechanism 21, an I/O device 19 according to an embodiment of the invention, and control software (not shown). Positioning mechanism 21 serves the purpose of manipulating monitor 23 for ease of viewing while working.

Monitor stand 23, housing I/O device 19, may be a part of the monitor housing, or may be separate, such that the monitor and its positioning mechanism is simply supported on stand 23.

In this embodiment, an item 15, such as a photograph or printed document, is placed on a mechanically driven platen 17 that feeds the item into I/O device 19. Platen 17 is shown extended from I/O device 19 as it initially would be when an item 15 is being placed for feeding into the device. A document entering I/O device 19 is supported by mobile platen 17 which movement is controlled by means of two sets of motor-driven roller assemblies more fully described below. One set of roller assemblies supports the platen while a second set of roller assemblies exerts a force on the top side of the platen.

Platen 17 supports and moves document 15 past a scanner mechanism and a print module within device 19, and further to the opposite side of the monitor stand where the document, shown again as element 15, may be retrieved from an extended platen.

It is not required that platen 17 pass entirely through a housing and emerge on the opposite side. In some embodiments of the invention, similar to that shown by FIG. 1b, a platen enters the housing, moves a document past printer and scanner positions, then reverses direction and presents the processed document back to the user at a common entrance/exit opening.

In an alternative embodiment stand 23 may also represent a computer housing, such as is conventionally used for housing a CPU, random access memory (RAM), a communication bus, I/O ports and the like, but in the case of the invention also houses an I/O device 19 according to the present invention, capable of both scanning and printing operations.

FIG. 1b is an isometric illustration of a system 31 for scanning and printing in which a double-slot input-output (I/O) device 35, used for scanning and printing, is integrated into a support stand 43 for a computer monitor according to another embodiment of the present invention. System 31 is functionally similar to the system shown in FIG. 1a, and supports a monitor 33, but the entrance and exit for documents relative to I/O device 35 are located on the same side of monitor stand 43.

A document entering I/O device 35 is supported by structure within the device and transported by means of two sets of motor-driven roller assemblies, as is described in more detail below. One set of roller assemblies contacts the document on its front side while a second set of roller assemblies contacts the document on the opposite side. When a document reaches the rear of I/O device 35, a deflector plate deflects the document and feeds it to a third and fourth set of roller assemblies that bring the document back to the front of I/O device 35. Paper trays such as trays 39 and 41 serve to guide and support documents scanned and/or printed. Generally, either tray may be designated input or output.

As in the case of the embodiment described above with reference to FIG. 1a, the embodiment of FIG. 1b might also comprise a computer enclosure.

Figure 2A:
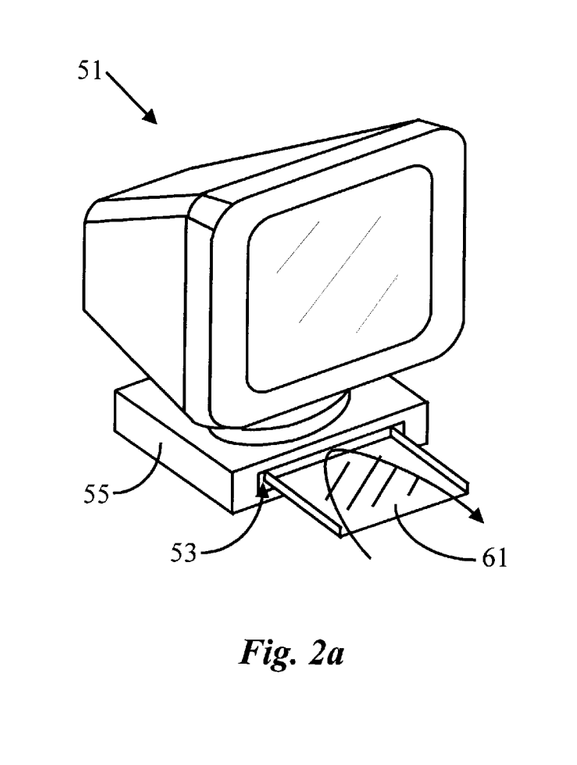
FIG. 2a is an isometric illustration of an I/O device according to yet another embodiment of the invention.

FIG. 2a is an isometric illustration of system 51 for scanning and printing. In this embodiment of the present invention, system 51 is functionally similar to the system shown in FIG. 1b, but has an I/O device 53 having one slot only. In this embodiment, document feeding and retrieving is accomplished with a first and second set of roller assemblies that reverse direction of rotation when a scan or print process is completed, and documents processed enter and exit the same opening. System 51 has a single paper tray 61 attached to the front of monitor stand 55, which houses device 53. In the embodiment of FIG. 2a, as in other embodiments, the monitor stand housing the device of the invention may be a part of the monitor case, or it may constitute a stand-alone case.

Figure 2B:
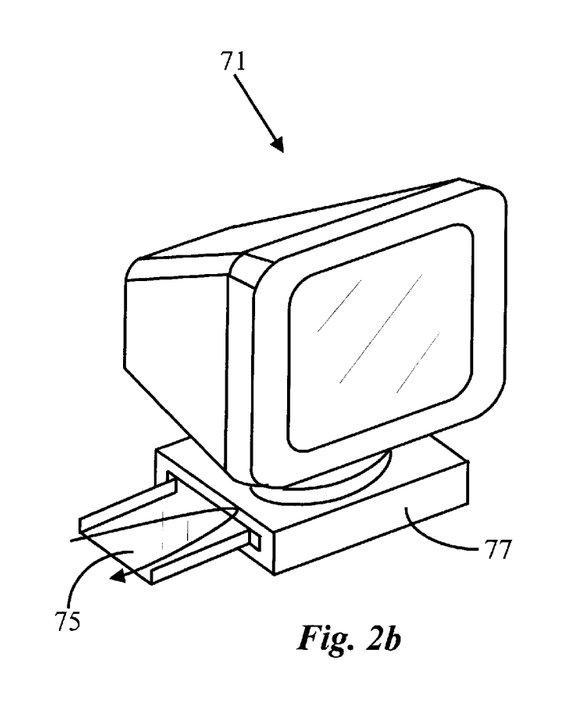
FIG. 2b is an isometric illustration of still another embodiment of the present invention.

FIG. 2b is an isometric illustration of a system 71 for scanning and printing in yet another alternate embodiment of the present invention. System 71 is functionally the same as system 51 of FIG. 2a, and comprises a single paper tray 75 at the side of monitor stand 77.

In the embodiments of both FIG. 2a and FIG. 2b, monitor stands 55 and 77 each contain an I/O device with support structure for supporting documents processed, and motor-driven roller assemblies for document transport. The absence of an external mechanical extension of a platen, as illustrated in FIG. 1b, allows the overall device and system to be smaller. Also, as in the embodiments described above with reference to FIGS. 1a and 1b, the embodiments of FIGS. 2a and 2b might also represent I/O devices integrated into a computer enclosure, such as a desktop or tower type computer.

As described above, a monitor stand serving as a housing for an embodiment of an I/O device according to the present invention may be a separate stand upon which a monitor may be placed, or may be a part of the structure of the monitor enclosure. It will be apparent to those with skill in the art that there are a number of other ways that an I/O device according to embodiments of the present invention may be integrated into a computer system. For example, an I/O device may be incorporated in a computer case with main CPU board, various disk drives, and other elements as is known in the art. Such an embodiment would add only nominally to the dimensions of the case. Moreover, devices according to the invention may be incorporated into computer cases in all of the variations described above for monitor stands. Such an I/O device may also be built into, for example, an enclosure that may be positioned or mounted in many ways at a personal workstation, such as fastened under a desk surface, or in a drawer-like compartment in an article of furniture.

Document-Transport Assembly

Figure 3:
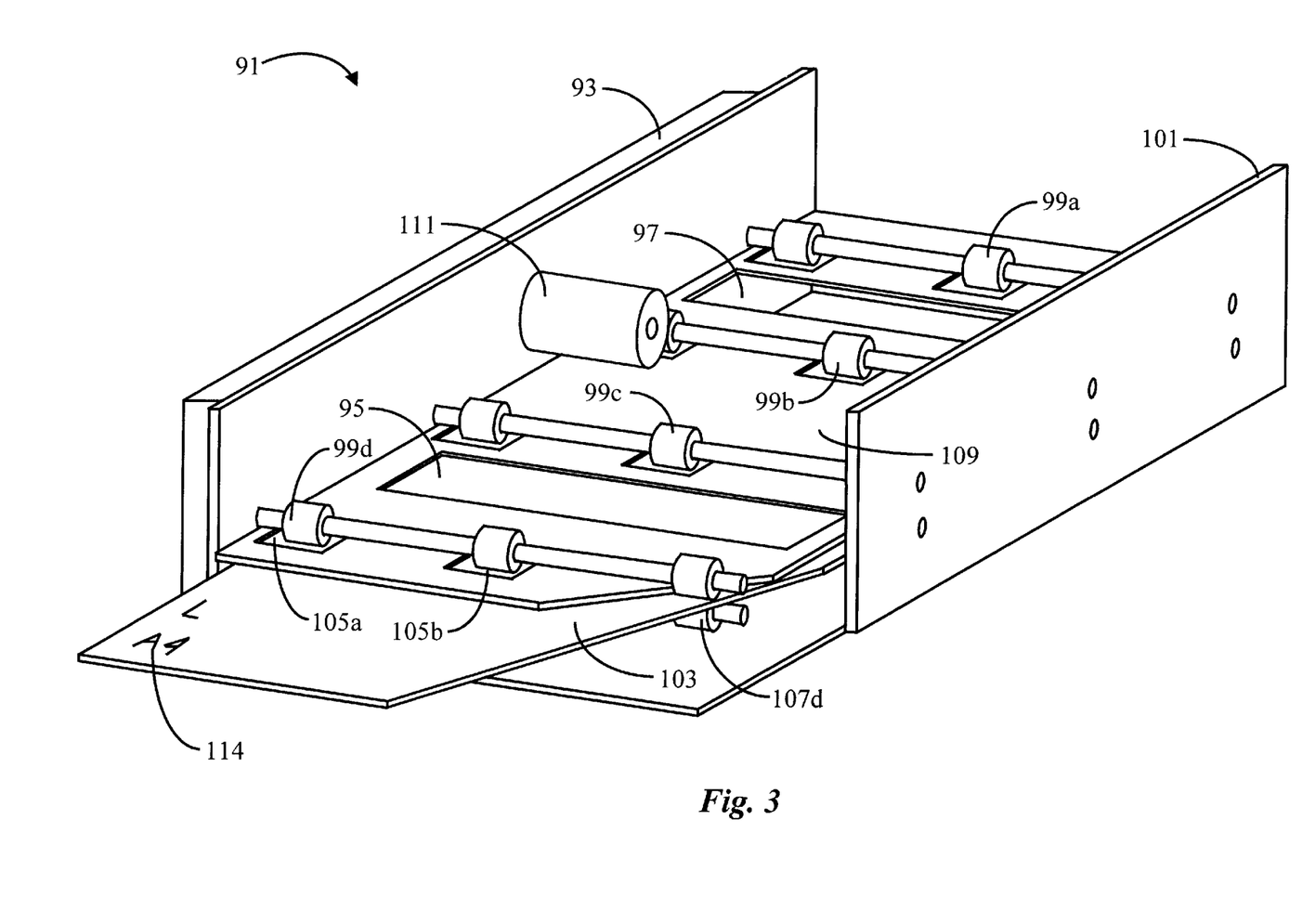
FIG. 3 is an isometric illustration of a document-transport apparatus for an I/O device according to an embodiment of the present invention.

FIG. 3 is an isometric illustration of a document-transport assembly 91 of an I/O device such as device 19 of FIG. 1a. Certain portions, as will become clear in the following description, have been cut away to better reveal other components.

Document-transport assembly 91 comprises a U frame 101, a platen 103, a guide plate 109, a first set of roller assemblies (99a, 99b, 99c, 99d), and a second set of roller assemblies beneath platen 103 of which roller assembly 107d is exemplary. Roller assemblies 107a, 107b, 107c are not visible in FIG. 3, but are positioned generally opposite assemblies 99a–99d. There are also a gear box assembly 93 and an electric motor 111. Electric motor 111 is mounted on the inside of U frame 101, and it simultaneously drives by means of gearbox 93 all members of first set of roller assemblies 99 and all members of second set of roller assemblies 107. It will be apparent to one with skill in the art that there are many possible variations in the construction of a gearbox or location of an electric motor, and that an electric motor may be an integrated part of a gearbox.

Platen 103 serves to carry a printed sheet, a photograph, or the like, or a blank sheet to be printed, and may be moved into or out of document-transport assembly 91 by controlling the direction of rotation of electric motor 111. Platen 103 is supported by roller assemblies 107x while roller assemblies 99x exert downward pressure on the platen and any document or sheet on the platen.

To provide sufficient friction between rollers and the platen, the rollers may be constructed from resilient material such as but not limited to rubber and resilient polymers. It will be apparent to one with skill in the mechanical arts that there are a number of different ways that the upper and lower shafts may be driven, and the arrangement shown is exemplary.

To guide a document or blank through transport assembly 91, and to prevent such a blank or sheet from curling, a stationary guide plate 109 is spaced apart from platen 103 by several times the thickness of a document or blank to be processed. This gap may be adjustable in different embodiments. Guide plate 109 has various openings. For example, openings 105a and 105b are part of a group of openings through which rollers of roller assembly 99d contact platen 103 and a document or sheet it carries.

Guide plate 109 also serves as a mounting base for a scanner module and for a printer module. In this embodiment, opening 95 provides, for a scanner module, a view of a document that passes through document-transport assembly 91. The size of opening 95 is made to match the dimensions of a commercially available scanner module to be used. Similarly, opening 97 provides a printer module access for printing to a blank sheet, or other sheet to be printed, that passes through document-transport assembly 91. The size of opening 97 is made to accommodate dimensions of a commercially available printer module to be used. As is well known in the art, there are a number of commercially available print engines and scanner engines that might be used.

Figure 4A:
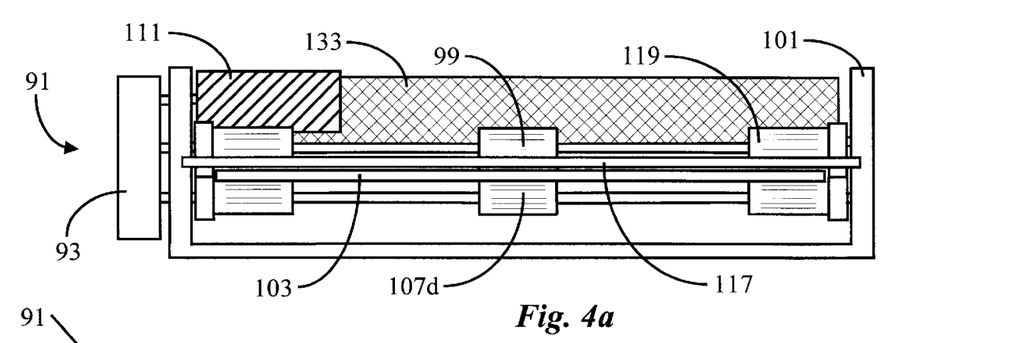
FIG. 4a is a front elevation view of a document-transport assembly according to an embodiment of the present invention.
Figure 4B:
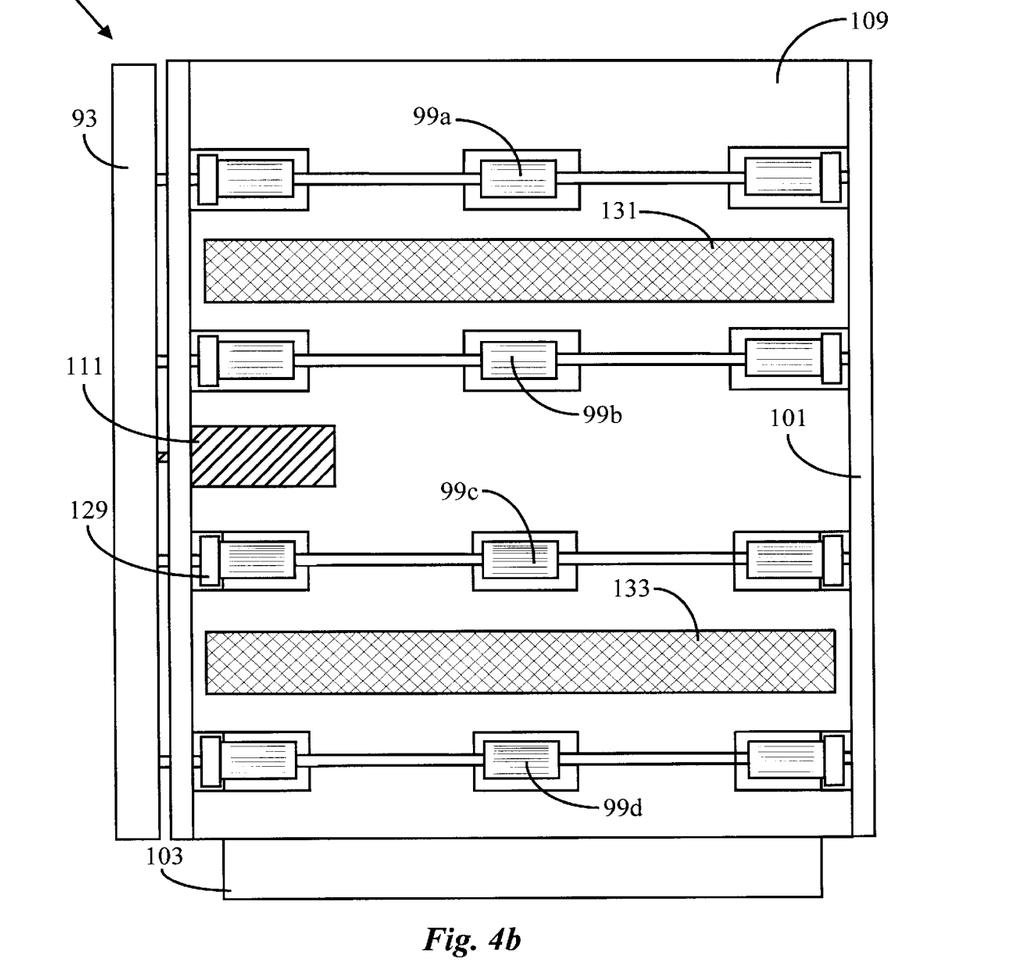
FIG. 4b is a top plan view of a document-transport assembly according to an embodiment of the present invention.

FIG. 4a is a front elevation view and FIG. 4b is a top plan view of the document-transport assembly 91 of FIG. 3. Document-transport assembly 91, as described above, comprises U frame 101, guide plate 109, platen 103, gearbox 93, electric motor 111, upper roller assemblies 99a, 99b, 99c, 99d, and lower roller assemblies 107d (members 107a, 107b, and 107c are not seen in FIGS. 4a and 4b).

Rollers on roller assemblies 99a–99d contact platen 103 or a document or other article on platen 103, through openings such as openings 105a and 105b in guide plate 109. In this embodiment of the present invention, each roller on the left and right side of a roller assembly has a guide flange such as guide flange 129 to constrain and guide platen 103.

Print and Scan Modules

A printer module 131 in the embodiment of FIGS. 4a and 4b is mounted over opening 97 (FIG. 3) in guide plate 109. This printer module, may be, but is not limited to, a commercially available inkjet module, which is operated by suitable electronic control circuitry. If an inkjet print module is used, it is mounted such that the inkjet head moves just above the surface of platen 123. It will be apparent to those with skill in the art that there are many printing modules that may be implemented such as, but not limited to, inkjet, dot-matrix, laser and thermal. A scanner module 133 (FIG. 4a, 4b) is mounted over opening 95 (FIG. 3) in guide plate 109 according to requirements of any particular model. Scan module 133 may be a commercially available linear or area charge-coupled device (CCD) as is known in the art, which may be operated by suitable electronic control circuitry and with suitable illumination from within the module. Scan module 133 scans text and graphics of documents driven through I/O devices according to various embodiments of the invention, and provides scan data to a host computer through a suitable communication system. Those with skill in the art will recognize that the technology of serial or parallel communication of digital data is old in the art, and that this portion of the present invention may be implemented with little difficulty by those with skill in the art, using well-known equipment and techniques.

Document Positioning

Plate-position sensors are used in embodiments of the invention to inform control circuitry of platen position, and in some cases, paper position as well. In most embodiments the position of the platen is monitored by means of optical sensors that sense small openings at specific positions in the platen. It will be apparent to those with skill in the art that there are a number of equivalent ways that position markers may be sensed. For example, one may use mechanical switches or magnetic sensors.

Platens in embodiments of the present invention are marked with outlines for a user to correctly position documents of different sizes. The location of these outlines correlate with sensor positions on the platen. FIG. 3 illustrates markings 114 on platen 103.

Document Retention

For a document or blank sheet to be scanned and/or printed accurately, it is necessary that the document or blank sheet to be printed be held in a particular position on the platen while processing takes place. This may be done in a number of ways. In the embodiment described above, for example, a document or blank sheet is held by the upper rollers (99x) against the platen, and guided by plate 99.

Figure 5A:
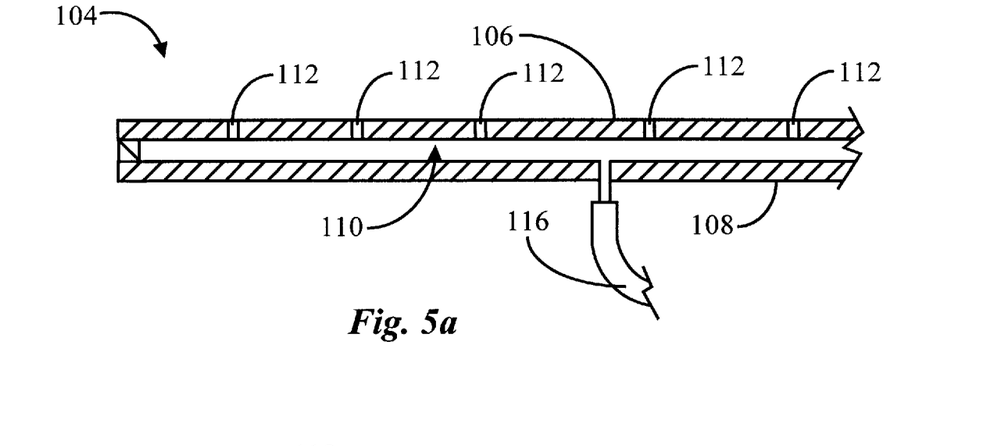
FIG. 5a is a partial cross-section of a platen according to an embodiment of the present invention for retaining a document by pressure differential.

In an alternative embodiment, documents and blank sheets are held to a platen by pressure differential. FIG. 5a illustrates a portion of a platen 104 wherein the platen is constructed of an upper plate 106 and a lower plate 108, leaving an enclosed volume 110 between the plates. Plates 106 and 108 form a single platen by being spaced apart and sealed around the edges. A flexible vacuum line connection 116 leads to a vacuum supply (not shown) for maintaining a partial vacuum on in the enclosed volume of the platen. Small openings (holes) such as openings 112 in strategic positions over the upper surface of platen 104 provide for holding a document or blank sheet on the platen by pressure differential when such a blank sheet or document covers one or more of the holes 112.

It will be apparent to those with skill in the art that there are a number of ways vacuum may be used to implement document retention by pressure differential, using apparatus and methods known in the art.

Figure 5B:
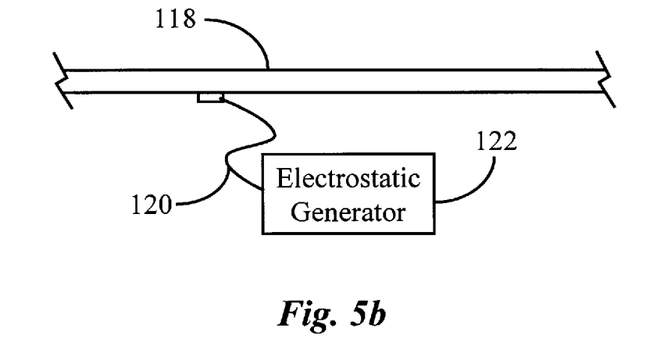
FIG. 5b is a partial cross-section of a platen according to an embodiment of the present invention for retaining a document by electrostatic attraction.

In another embodiment, documents are retained by charging a platen to an electrical potential such that documents or blank sheets are held to the platen by electrostatic attraction. FIG. 5b illustrates a portion of a platen 118 connected by a flexible electrical connection 120 to a generator 122 for maintaining the platen at a voltage potential relative different than that of a document or sheet to be processed. It will be apparent to those with skill in the art that there are a number of ways existing apparatus may be utilized to provide an electrostatic platen document retention system.

Figure 5C:
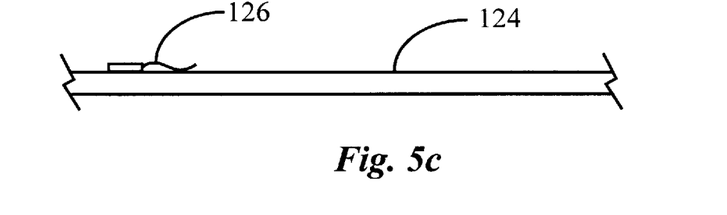
FIG. 5c is a partial cross-section of a platen according to an embodiment of the present invention for retaining a document by use of mechanical hold-down devices.

In yet another embodiment a platen has mechanical hold-down devices for retaining documents and blank sheets. FIG. 5c illustrates a portion of a platen 124 wherein a spring-metal hold-down 126 is secured to the platen by a fastener. In this embodiment a user simply inserts the edges of a document beneath hold-down elements of the sort illustrated. There are a wide variety of such hold-down devices known that might be used. In a variation of this embodiment, hold down devices may be removed from one position on a platen and inserted at another quickly and easily. By this expediency, small documents, such as business cards may be held on a platen, and large documents may be held on the same platen at a different time without the hold-downs for the smaller document interfering with the larger document.

In embodiments wherein vacuum, electrostatis, or physical holding mechanisms are used, the importance of upper guide plate 109 is diminished. In some embodiments the guide plate is not used at all, and the print and scan mechanisms are mounted to U-frame 101.

Paper-Only Personal I/O Device

The descriptions above of document feeding and management describe a system wherein a platen is driven between upper and lower roller sets, and documents placed and retained on the platen may be passed by scanning and printing engines by movement of the platen. In FIGS. 1b, 2a, and 2b above, however, devices are illustrated wherein a platen is not used. Instead, roller sets are utilized for moving a document past scanning and printing equipment.

Figure 6A:
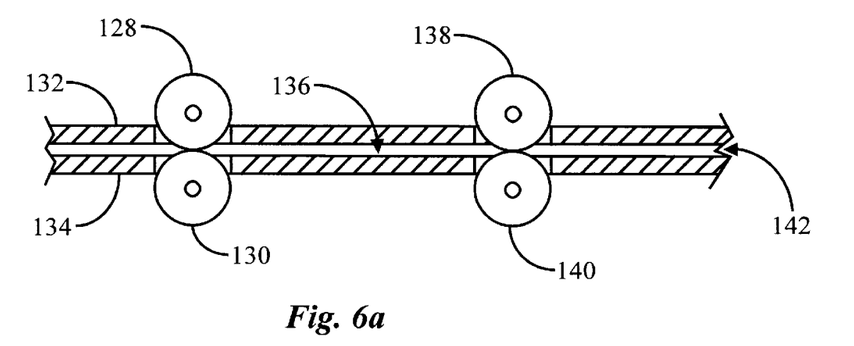
FIG. 6a is a partial cross section of a portion of a document drive system according to an embodiment of the present invention utilizing two guide plates and rollers for handling a document without a platen.

FIG. 6a is a partial cross section of a portion of a document drive system according to an embodiment of the present invention utilizing two guide plates and rollers for handling a document without a platen. In this embodiment upper and lower roller assemblies have rollers that contact documents and blank sheets and move them through a personal I/O device according to an embodiment of the invention.

Roller assemblies 128, 130, 138, and 140 in FIG. 6 are similar to roller assemblies 99a–99d and 107a–107d in FIG. 3 and other Figs. described above. Guide plate 132 is similar to guide plate 109 in FIG. 3, and has openings through which rollers on the roller assemblies may contact a document or blank sheet to be processed.

Instead of a platen as shown in FIG. 3, in the embodiment of FIG. 6 a lower stationary guide plate 134 very like guide plate 132 is spaced apart from guide plate 132 such that a blank sheet or document to be processed may be inserted in space 142 between the guide plates such that rollers may contact the blank sheet or document on both sides. Relative rotation of the rollers then moves a document through the I/O device.

It will be apparent to those with skill in the art that opposing rollers as shown in FIG. 6a may be strategically placed over the width of an I/O device and the length of a paper path to conveniently move a document, and also that the strategic placement may be such that both small documents and large documents may be efficiently handled.

Figure 6B:
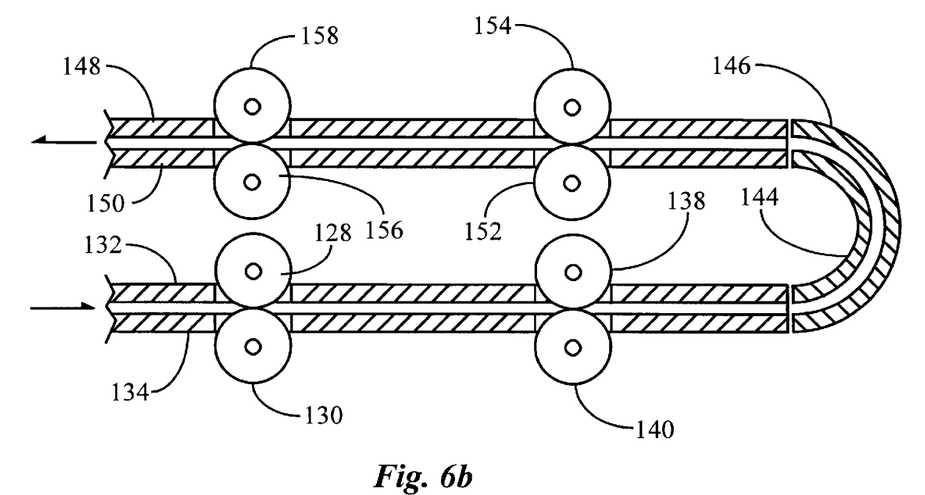

FIG. 6b is a partial cross-section of a portion of a turn-around apparatus for use with a document drive system such as that described by FIG. 6a. In this embodiment opposed guide plates 132 and 134 with roller assemblies 128, 130, 138, and 140 feed a document or a blank sheet into opposed curved plates 144 and 146, which guide the document or sheet into a second set of opposed guide plates 148 and 150, which have roller assemblies 152, 154, 156, and 158. In this arrangement documents and blank sheets may be fed into one opening in a housing and retrieved from another opening in the same side or wall of the housing.

Control Circuitry

Figure 7:
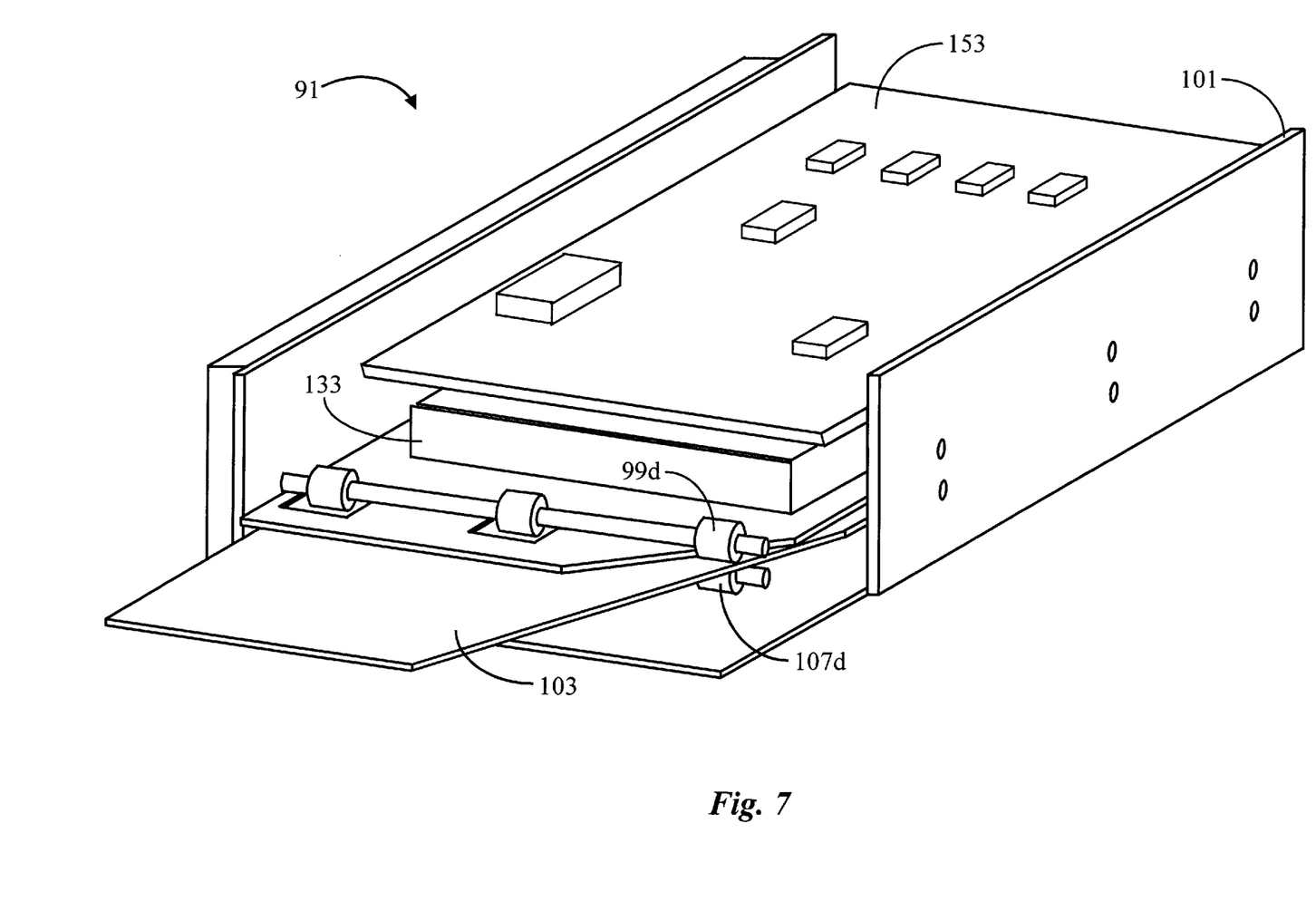
FIG. 7 is an isometric view of an I/O device according to the present invention including a control section.

FIG. 7 is an isometric illustration of I/O device 91 shown in previous illustrations, including a control printed circuit board (PCB) 153. Platen 103 is shown partly cut away to reveal the relative position of various elements. I/O device 91 comprises but is not limited to U frame 101, scanner module 133, printed circuit board 153, platen 103, and roller assemblies such as assemblies 99d and 107d. Printed circuit board 153 contains electronic circuitry necessary to perform functions such as, but not limited to, platen movement, paper sensing, scanner control, printer control, and communication to a host computer. In some alternative embodiments of the invention, printed circuit board 153 is implemented as several smaller PCBs to accommodate available space within U frame 101. In other embodiments some or all of the control functions are implemented on boards mounted elsewhere in an integrated device, such as a monitor stand or computer enclosure. Electrical power to operate the electric motor and the electronic circuitry of an I/O device is typically derived from a power supply mounted in the same housing as the I/O device. Alternatively, electrical power may be obtained from either a monitor-resident or computer-resident power supply.

It will be apparent to those with skill in the art that there are many variations that may be made in the details of the control electronics and the power source for an I/O device. The control circuitry may, for example, comprise a local controller and memory for facilitating printing and scanning operations, so a host computer will not have to exercise micro-managed control over the I/O device. In this case, a host can deal with the I/O device with relatively high-level commands, and the I/O device can store data for printing and scanned data for transmittal to the remote host.

Referring again to FIG. 1b, in most embodiments a power on-and-off switch 47 and a reset switch 45 are provided as an integral part of the housing of an I/O device. Light emitting diodes (LEDs) may also be used for status indication such as power off, power on, scanning in progress, and printing in progress. Error messages generated by an I/O device may be sent to a host computer and displayed on a monitor, or may be displayed by means of an alpha-numeric liquid-crystal display (LCD) or an alpha-numeric display based on light emitting diodes (LED) implemented on the housing of an integrated I/O device.

User Interface

Figure 8:
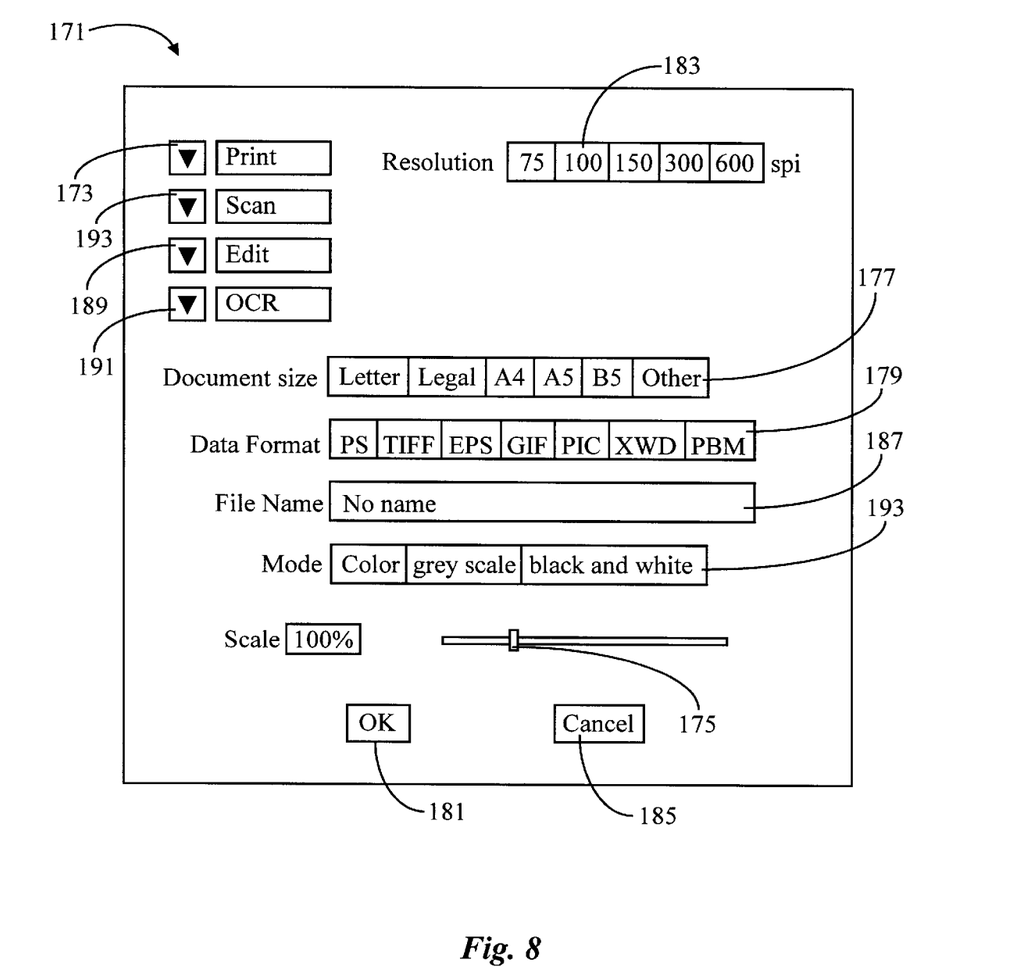
FIG. 8 is an illustration of an example user-interface menu for a personal desktop system for scanning and printing according to an embodiment of the present invention.

FIG. 8 shows an example of a user-interface menu 171 for a personal desktop system for scanning and printing according to an embodiment of the present invention. User-interface menu 171 comprises, but is not limited to, a print button 173, a scan button 193, an edit button 189, an OCR button 191, a set of resolution buttons 183, a set of document-size buttons 177, a set of data-format buttons 179, a file-name field 187, a set of mode buttons 193, a scale vernier 175, an OK button 181, and a cancel button 185. As is well-known in the art, a user interface need not be a single menu but may be a set of interactive menus displayed selectively on a host's video monitor when an I/O device is activated. A unique keystroke combination displays user-interface menu 171.

In interface 171 a user may select the print function by clicking on button 173 or may select the scan function by clicking on button 193. Parameters associated with each of these functions are set by clicking buttons or by selecting values in the various menu fields. Scan resolution, for example, may be selected by clicking on a desired SPI (samples per inch) number in resolution field 183. The format of data generated by a scanner may be selected by means of data-format buttons 179. Similarly, if the format of the data to be printed is postscript (PS), a user must select the PS option in data-format field 18. The actual size of a scanned image may be selected by sliding a scale vernier 175 to a desired scale factor. Likewise, the size of the original document is entered in field 177 where each button corresponds to outlines 114 (FIG. 3) marked on platen 103 (FIG. 3) of I/O device 91 (FIG. 3). A name for a file in which to store scanned data or a name of a file that contains data to be printed may be entered in field 187. When all parameters are set, a user may click on OK button 181 to initiate the scan or print process or may click on a cancel button 185 to terminate the scan or print process and return to a previously running application.

Those with skill in the art will recognize that designing user interfaces is old in the art, and that this portion of the present invention may be implemented with little difficulty by those with skill in the art, using well-known equipment and techniques, even though the combination of functions disclosed is new in the art.

Print Process Description

In various embodiments of the present invention control routines are provided for a host computer to operate an I/O device according to the invention, just as software routines are provided for most commercially available printers. These routines are commonly known as drivers in the art, and are compatible with well-known word processors, spreadsheets, CAD applications, and the like. The drivers for an I/O device in a preferred embodiment of the present invention may be furnished on, but not limited to, a media such as a floppy disk, a CD-ROM, or a magnetic tape. The drivers also may be furnished as a part of an operating system. It will be apparent to those with skill in the art that there are many variations in control routines and interactive screens that may be used to manage operations of an I/O device according to various embodiments of the present invention described above.

Figure 9:
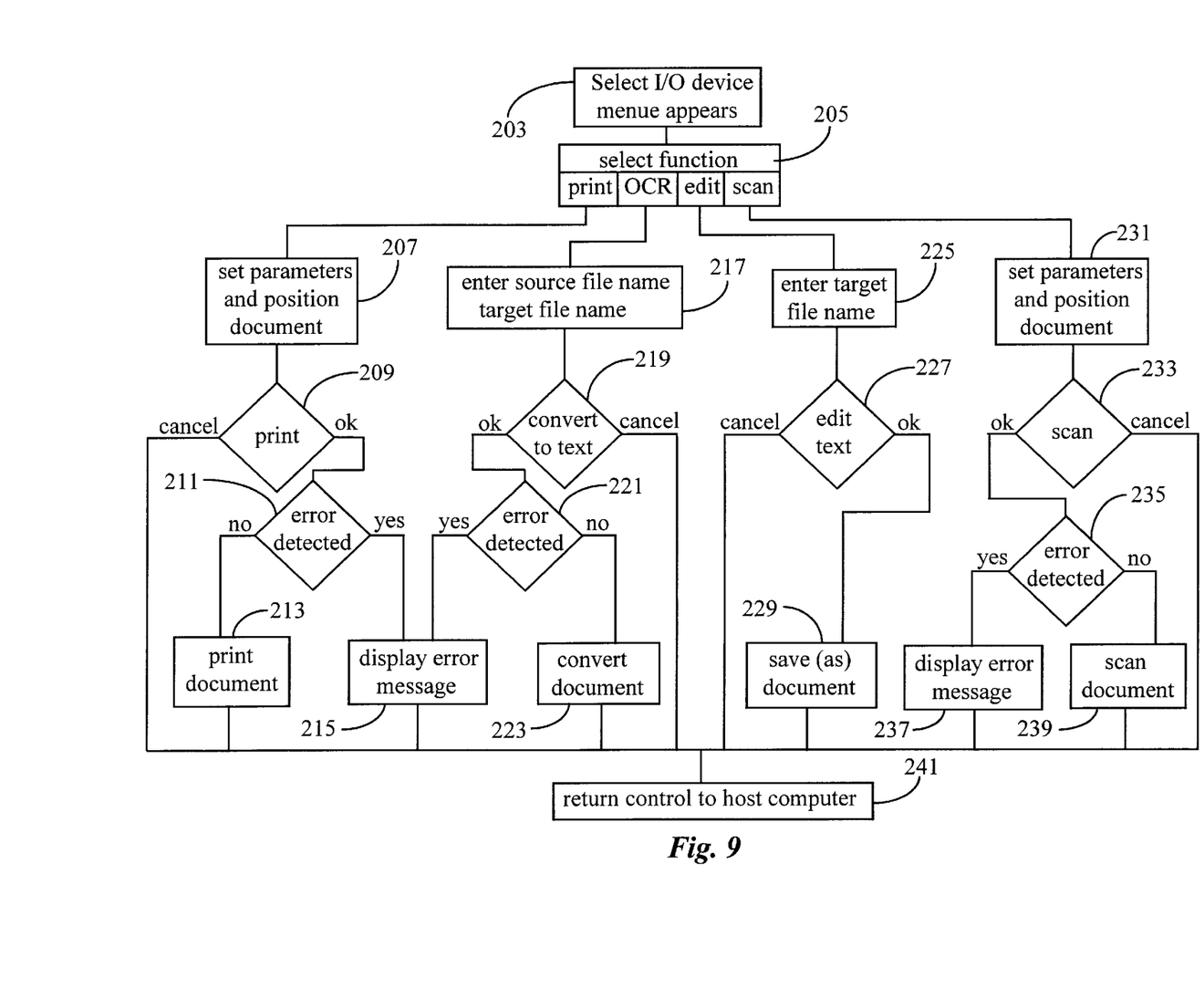
FIG. 9 is a flow diagram depicting steps in scanning or printing a document according to an embodiment of the present invention.

FIG. 9 is a flow diagram depicting steps in scanning and printing a document according to an embodiment of the present invention. The process of printing or scanning a single document starts at step 203 when a user enters an initiation signal, such as by a unique keystroke, much in the manner of operating a fax modem as is well-known in the art. As a result of the initiation signal, any running application will be interrupted, and a menu similar, but not limited to, the layout of menu 171 (FIG. 8) appears on the screen.

Once printing is selected as an operation-either from an running application with which the control routines of an I/O device are compatible, or from the unique capability of the control routines of an I/O device, the I/O device is initiated to extend its platen, if it of the platen type, to receive a paper or other stock for printing. A user may proceed in step 205 by selecting, for example, the print function by clicking on button 173 (FIG. 8). At step 207, a user enters in field 187 (FIG. 8) the name of the file to be printed and specifies parameters such as, but not limited to, paper size 177 (FIG. 8). When all necessary parameters are set, a user positions a sheet of paper within the marked area on the platen according to the selected paper size.

At step 209, a user has the option to proceed with printing or to exit the print routine, which returns at step 241 computer control to a previously running application. Clicking on OK button 181 (FIG. 8) leads to error detection in step 211. An error encountered by a print routine leads to step 215 where the type of error is displayed on the screen. If no error is detected, the print process starts at step 213. Those with skill in the art will recognize that error detecting and reporting is old in the art, and that this portion of the present invention may be implemented with little difficulty by those with skill in the art, using well-known equipment and techniques. At step 241, when the print process is completed, the print routine terminates, and computer control returns to a previously running application.

Buttons and menus for text-processing tools such as font type, font size, spelling checker, and the like are available to a user from menu 171 (FIG. 8) by clicking (step 205 FIG. 9) on edit button 189 (FIG. 8). Once a user is satisfied with the result of an editing operation, a text file can be saved through selection of functions from the edit menu. Typically, in step 229 (FIG. 9) a save window is displayed on the screen with fields for supplying a file name and directory path, and action boxes for initiating the actual save to a non-volatile storage medium such as a hard disk associated with a host computer.

Scan Process Description

Returning to step 205, a user may select the scan function by clicking on button 193 (FIG. 8). Once scanning is selected as an operation, either from a running application with which the control routines of an I/O device are compatible, or from the unique capability of the control routines of an I/O device-an I/O device is initiated to extend the platen, if the I/O device is of the platen type, to receive a document for scanning. A user may proceed at step 231 by setting the value of various parameters such as, but not limited to, data format 179 (FIG. 8), resolution 183 (FIG. 8), and document size 177 (FIG. 8). A scale factor may be selected by sliding a scale vernier 175 (FIG. 8) to a desired value while in field 187 (FIG. 8). At step 233, a user has the option to exit the scan routine which returns at step 241 computer control to a previously running application. Clicking on OK button 181 (FIG. 8) leads to error detection in step 235. If an error encountered by the scan routine, the type of error will be displayed on the screen at step 237, and the scan routine will be terminated at step 241. Alternately, if no error is detected, the scan routine continues and scans the document at step 239. At step 241, the scan process is completed, and computer control returns to a previously running application. One may then retrieve the document and reset the system to return the platen to the internal idle position. Reset may be done by reset push button 45 (FIG. 1b).

As a document is scanned, the result of the scanning operation appears on the monitor screen next to menu 171 (FIG. 8). To be able to edit a scanned text document, a user also may submit the document to an OCR routine that translates a pixel-based file into a ASCII-based file in a manner as illustrated by steps 205, 217, 219, 221, 215, and 223 in FIG. 9. After an OCR routine has completed translation, ASCII-based text will be displayed in place of the pixel-based text, and a user may then edit the text in word-processing applications as is known in the art. Buttons and menus for image postprocessing tools such as rotation, scaling, OCR and the like are available to a user from menu 171 by clicking on an OCR button 191. Once the printing or scanning has been done, an I/O device operates to eject the document, for example, as is illustrated in FIG. 1a for a straight-through model.

Modularity

A significant feature of the present invention is modularity. I/O devices according to embodiments of the present invention may be manufactured and sold in the U-frame form depicted in several Figs. of the disclosure, such as FIG. 3 and FIG. 7. In this form, there may be alternate openings for mounting print and scan engines, and alternative mounting positions for various other elements, such as the drive motor. In this form, added value manufacturers may purchase I/O devices and integrate them into stand-alone enclosures, into computer housings, into monitor stands, and into other equipment that may normally be present at an end-user's work station. Alternatively I/O devices may be sold already integrated into one or another of enclosures which are suitable for others to add motherboards, disk drives, and the like, to make computers integrated with the I/O devices.

It will be apparent that there are a great many alterations in detail that may be made in the embodiments described without departing from the spirit and scope of the invention. Many of these deviations have already been described above. There are many more. For example, the U-frame described above can be implemented in a number of different ways. The drive mechanisms may also be done in several ways. There are many other deviations within the spirit and scope of the invention.

What is claimed is:

1. A hardcopy Input/Output (I/O) device, comprising:
a frame and enclosure for supporting and positioning elements of the device;
a scanning mechanism supported by the frame;
a printing mechanism supported by the frame;
a document drive apparatus including a platen having a width, a length and a substantially planar upper surface and adapted to translate linearly in the plane of the platen in the direction of the length, the platen having also a sheet holder adapted for holding a single document or printable sheet during translation; and
control circuitry for managing and coordinating operation of the document drive apparatus, the scanning mechanism, and the printing mechanism;
wherein the scanning and the printing mechanisms are positioned to scan and print substantially at the upper surface across the width of the platen, the drive apparatus is adapted to translate a document or printable sheet held in the holder fully past both the scanner and the printer mechanisms, and wherein the control circuitry operates the document drive apparatus to move the translatable platen within the enclosure past the scanner and printer mechanisms and outside the enclosure, presenting the sheet holder to a user in a manner that a single document or sheet may be loaded and unloaded.

2. An I/O device as in claim 1 wherein the document drive apparatus comprises the translatable platen spaced apart from a guide plate, with drive rollers contacting the platen through openings in the guide plate.

3. An I/O device as in claim 1 wherein the sheet holder comprises a construction of first and second spaced-apart and joined plates defining an inner volume, the inner volume connected to a vacuum source, the first spaced-apart plates having openings therethrough for creating a pressure differential over a sheet placed on the first plate and covering one or more of the openings.

4. An I/O device as in claim 1 wherein the sheet holder comprises a plate connected to an electrical generator for charging the plate to an electrostatic potential for attracting and holding documents to be scanned or printed.

5. An I/O device as in claim 1 wherein the document drive apparatus comprises two spaced-apart guide plates defining a space between the guide plates with drive rollers extending through openings in the guide plates into the space between the guide plates.

6. An I/O device as in claim 5 wherein the document drive apparatus comprises two sets of spaced-apart plates and drive rollers, one above the other, the two sets defining an upper document drive apparatus and a lower document drive apparatus at different levels, and also comprises a turn-around passage leading from the space between one set of guide plates to the space between the other set of guide plates, for guiding a document from one of the upper and the lower drive apparatus to the other.

7. A computer comprising:
a CPU;
a random access memory coupled to the CPU;
a communication bus;
and an Input/Output (I/O) device, comprising:
a frame and enclosure for supporting and positioning elements of the device;
a scanning mechanism supported by the frame;
a printing mechanism supported by the frame;
a document drive apparatus including a platen having a width, a length and a substantially planar upper surface and adapted to translate linearly in the plane of the platen in the direction of the length, the platen having also a sheet holder adapted for holding a single document or printable sheet during translation; and
control circuitry for managing and coordinating operation of the document drive apparatus, the scanning mechanism, and the printing mechanism;
wherein the scanning and the printing mechanisms are positioned to scan and print substantially at the upper surface across the width of the platen, the drive apparatus is adapted to translate a document or printable sheet held in the holder fully past both the scanner and the printer mechanisms, and wherein the control circuitry operates the document drive apparatus to move the translatable platen within the enclosure past the scanner and printer mechanisms and outside the enclosure, presenting the sheet holder to a user in a manner that a single document or sheet may be loaded and unloaded.

8. A computer as in claim 7 wherein the document drive apparatus comprises the translatable platen spaced apart from a guide plate, with drive rollers contacting the platen through openings in the guide plate.

9. A computer as in claim 7 wherein the sheet holder comprises a construction of first and second spaced-apart and joined plates defining an inner volume, the inner volume connected to a vacuum source, the first spaced-apart plates having openings therethrough for creating a pressure differential over a sheet placed on the first plate and covering one or more of the openings.

10. A computer as in claim 8 wherein the sheet holder comprises a plate connected to an electrical generator for charging the plate to an electrostatic potential for attracting and holding documents to be scanned or printed.

11. A computer as in claim 7 wherein the document drive apparatus comprises two spaced-apart guide plates defining a space between the guide plates with drive rollers extending through openings in the guide plates into the space between the guide plates.

12. A computer as in claim 11 wherein the document drive apparatus comprises two sets of spaced-apart plates and drive rollers, one above the other, the two sets defining an upper document drive apparatus and a lower document drive apparatus at different levels, and also comprises a turn-around passage leading from the space between one set of guide plates to the space between the other set of guide plates, for guiding a document from one of the upper and the lower drive apparatus to the other.

* * * * *